(12) United States Patent
Murakami

(10) Patent No.: US 6,752,595 B2
(45) Date of Patent: Jun. 22, 2004

(54) PROPELLER TYPE WINDMILL FOR POWER GENERATION

(75) Inventor: Mitsunori Murakami, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 0 days.

(21) Appl. No.: 10/296,306

(22) PCT Filed: Mar. 26, 2001

(86) PCT No.: PCT/JP01/02425

§ 371 (c)(1),
(2), (4) Date: Nov. 21, 2002

(87) PCT Pub. No.: WO02/077449

PCT Pub. Date: Oct. 3, 2002

(65) Prior Publication Data

US 2003/0123973 A1 Jul. 3, 2003

(51) Int. Cl.[7] .................................................. F03D 7/12
(52) U.S. Cl. .............................. 416/87; 416/88; 416/89; 416/155; 416/223 R; 416/DIG. 5
(58) Field of Search .............................. 416/87, 88, 89, 416/203, DIG. 5, 155, 223 R

(56) References Cited

U.S. PATENT DOCUMENTS 3,814,351 A * 6/1974 Bielawa .................. 244/17.19
5,328,329 A * 7/1994 Monroe ....................... 416/62

FOREIGN PATENT DOCUMENTS

| JP | 57032074 A | 2/1982 |
| JP | 59160866 | 10/1984 |
| JP | 2001132615 A | 5/2001 |

* cited by examiner

Primary Examiner—Ninh H. Nguyen
(74) Attorney, Agent, or Firm—D. Peter Hochberg; Sean Mellino; Katherine R. Vieyra

(57) ABSTRACT

A plurality of wind turbine blades (3) are distributed equi-angularly within a plane perpendicular to a horizontal rotating shaft (2) and around a hub (1) provided on the horizontal rotating shaft (2); the blade body of each turbine blade includes therewithin a tip auxiliary blade (6) housed to be capable of extending toward and retracting away from a tip of the blade, and an auxiliary blade extension-and-retraction unit (8) for protruding the tip auxiliary blade (6) to increase the overall length of the blade; and when an airflow comes in at a low speed, the tip auxiliary blades (6) are protruded toward the tips to generate even greater rotating torque, thereby increasing a power generation output by the wind turbine.

8 Claims, 14 Drawing Sheets

(a)

(b)

(a)

(b)

(a)

(b)

PROPELLER TYPE WINDMILL FOR POWER GENERATION

TECHNICAL FIELD

This invention relates to a propeller-type wind turbine used in wind-powered electrical generation.

BACKGROUND ART

Because of its mountainous terrain, Japan, unlike Europe and elsewhere, is not blessed with steady, strong winds suited to the generation of electricity by wind power. In nearly all regions of Japan, the average annual wind speed is generally under 10 m/sec, and this is usually far below the rated output of a wind-powered electrical generator.

The amount of electricity generated by a wind turbine is as follows:

Generated amount W∝ρ(density)×A(wind receiving surface area)× V(wind speed).

Therefore, the conventional approach to increasing the amount of electricity generated by a wind turbine has been to increase the diameter of a rotor and develop large-scale machines.

The rated wind speed corresponding to the rated output of such large-scale machines is generally quite high (at least 10 m/sec), and it is rare to find an area where such high wind speeds are consistently in effect under ordinary weather conditions (that is, other than during typhoons and other storms), and at present such machinery operates at an output far below its rated output under normal wind conditions. Thus, when a large-scale machine is installed, the improvement in performance at low speed is not commensurate with the higher installation costs entailed by the larger structures (such as generators) required. Furthermore, a large wind receiving surface area makes it more difficult to cope with storm winds, so there is a higher level of danger as well.

It is therefore an object of the present invention to provide a power-generating propeller-style wind turbine with which power generation performance can be improved even in a low speed range.

DISCLOSURE OF THE INVENTION

One embodiment of the present invention is a power-generating propeller-style wind turbine provided with a plurality of turbine blades distributed equiangularly within a plane perpendicular to a horizontal rotating shaft and around a hub provided on the rotating shaft, characterized in that a blade body of each turbine blade includes therewithin a tip auxiliary blade housed to be capable of extending toward and retracting away from a blade tip, and an auxiliary blade extension-and-retraction unit for protruding the tip auxiliary blade toward the blade tip so as to increase an overall length of the blade.

With this structure, when wind speed is low, the tip auxiliary blade extension-and-retraction unit protrudes the tip auxiliary blades and elongates the overall length of the wind turbine blades, which increases lift of the vanes, raises rotating torque, and increases an amount of power generated. If the wind speed is so high that it exceeds a rated output (such as during a storm), the tip auxiliary blades can be retracted and stowed inside the blade bodies, which reduces drag of the turbine blades so that the structure is not subjected to excess load and damage can be prevented.

Another embodiment of the present invention is directed to a power-generating propeller-style wind turbine provided with a plurality of turbine blades distributed equiangularly within a plane perpendicular to a horizontal rotating shaft and around a hub provided on the rotating shaft, characterized in that a blade body of each turbine blade includes therewithin a tip auxiliary blade housed in the blade body able to extend towards and retract away from a blade tip, and an auxiliary blade extension-and-retraction unit for protruding the tip auxiliary blade toward the blade tip so as to increase an overall length of the blade, a leading edge auxiliary vane having an airfoil-shaped cross section capable of forming, between the vane and the blade body, a path for guiding an airflow to a rear face of the blade body, which is disposed at a leading edge portion of the blade body of each turbine blade so as to be capable of extending and retracting frontward in a rotational direction and a leading edge auxiliary vane extension-and-retraction unit for protruding the leading edge auxiliary vane frontwardly in the rotational direction and guiding the airflow from the formed path thus formed to the rear face of the blade body, thereby generating lift on the leading edge auxiliary vane and increasing a rotating torque of the turbine blade.

With this structure, lift will be generated at the tip auxiliary blades and the leading edge auxiliary vanes and the rotating torque will be further increased even though the incoming airflow is moving more slowly because of the tip auxiliary blades and the leading edge auxiliary vanes, thereby expanding the range of low wind speeds at which power generation is feasible.

Yet another embodiment of the present invention is a power-generating propeller-style wind turbine provided with a plurality of turbine blades distributed equiangularly within a plane perpendicular to a horizontal rotating shaft and around a hub provided on the rotating shaft, characterized in that a blade body of each turbine blade includes therewithin a tip auxiliary blade housed to be capable of extending toward and retracting away from a blade tip, and an auxiliary blade extension-and-retraction unit for protruding the tip auxiliary blade toward the blade tip so as to increase an overall length of the blade; a leading edge auxiliary vane having an airfoil-shaped cross section capable of forming, between the vane and the blade body, a path for guiding an airflow to a rear face of the blade body which is disposed at a leading edge portion of the blade body of each turbine blade so as to be capable of extending frontwardly in a rotational direction; a leading edge auxiliary vane extension-and-retraction unit is provided for protruding the leading edge auxiliary vanes frontward in the rotation direction and guiding the airflow from the path thus formed to the rear face of the blade body, so as to generate lift on the leading edge auxiliary vane and to increase a rotating torque of the turbine blade; and wherein the blade body of each turbine blade includes a rear auxiliary vane provided at a trailing edge portion and being capable of extending and retracting rearwardly in the rotational direction, and a rear auxiliary vane extension-and-retraction unit for protruding the rear auxiliary vane to extend rearwardly so as to increase a vane arc length.

With this structure, because of the increase in lift produced by the leading edge auxiliary vanes, the increase in lift produced by the tip auxiliary blades, and the increase in lift produced by increasing the vane arc length and/or vane camber with the leading edge auxiliary vanes and the trailing edge auxiliary vanes, more lift is generated at the turbine blades, the rotating torque is heightened, and the amount of electricity can be increased even with a low speed airflow.

The present invention also includes a structure as set forth above and including a pitch changing guide member for changing a pitch of the tip auxiliary blade is provided to an extension-and-retraction unit that guides the tip auxiliary blade to extend and retract.

With this structure, the pitch changing guide member allows the pitch of the vane bodies to continuous with that of the tip auxiliary blades, forming a vane of a better performance.

Still yet another embodiment of the present invention is a power-generating propeller-style wind turbine provided with a plurality of turbine blades distributed equiangularly within a plane perpendicular to a horizontal rotating shaft and around a hub provided on the rotating shaft, characterized in that a leading edge auxiliary vane having an airfoil-shaped cross section capable of forming, between the vane and the blade body, a path for guiding the airflow to a rear face of the blade body which is disposed at a leading edge portion of the blade body of each turbine blade so as to be capable of extending and retracting frontwardly in a rotational direction; and a leading edge auxiliary vane extension-and-retraction unit is provided for protruding the leading edge auxiliary vanes frontwardly in the rotational direction and guiding the airflow to the rear face of the blade body, thereby generating lift on the leading edge auxiliary vane and increasing a rotating torque of the turbine blade.

With this structure, lift will be generated at the leading edge auxiliary vanes and the rotating torque will be increased even though the incoming airflow is moving slowly, thereby expanding the range of low wind speeds at which power generation is feasible.

The present invention also includes a blade body of each turbine blade includes a rear auxiliary vane provided at the trailing edge portion and being capable of extending and retracting rearwardly in the rotational direction, and a rear auxiliary vane extension-and-retraction unit for protruding the rearwardly so as to increase a vane arc length.

With this structure, because of the increase in lift produced by the leading edge auxiliary vanes and the increase in lift produced by increasing the vane arc length and/or vane camber with the rear auxiliary vanes, more lift is generated at the turbine blades, the rotating torque is heightened, and the amount of electricity can be increased even with a low speed airflow.

Yet another embodiment of the present invention is a power-generating propeller-style wind turbine provided with a plurality of turbine blades distributed equiangularly within a plane perpendicular to a horizontal rotating shaft and around a hub provided on the rotating shaft, characterized in that the blade body of each turbine blade includes a rear auxiliary vane provided at a trailing edge portion and being capable of extending rearwardly in a rotational direction, and a rear auxiliary vane extension-and-retraction unit for protruding the rear auxiliary vane rearwardly so as to increase a vane arc length.

With this structure, the rear auxiliary vanes increase the vane arc length and/or the vane camber, and as a result, increase the lift generated at the turbine blades thereby to increase the rotating torque, so that more electricity can be generated even with a low speed airflow.

BEST MODE FOR CARRYING OUT THE INVENTION

In order to describe the present invention in further detail, a first embodiment of the power-generating propeller-style wind turbine will be described through reference to FIGS. 1 to 8.

Figure 1:
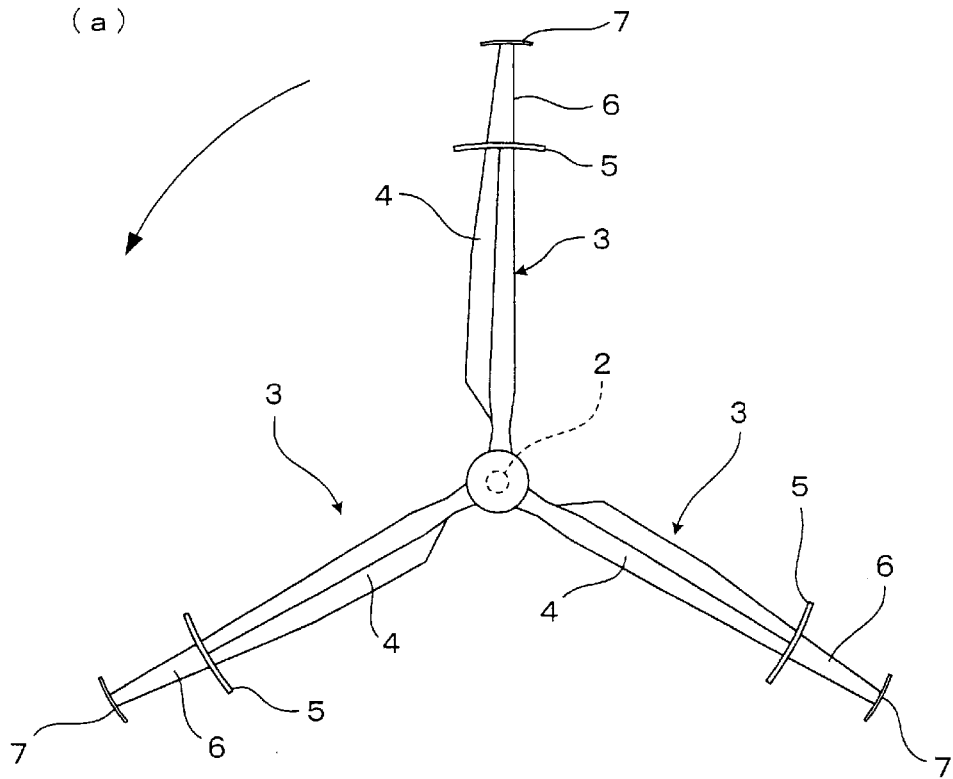
FIGS. 1 (*a*) and (*b*) illustrate a first embodiment of a power-generating propeller-style wind turbine pertaining to the present invention, with (a) being an overall front view of tip auxiliary blades in an extended state, and (b) an overall front view of the tip auxiliary blades in a stowed state.
Figure 1:
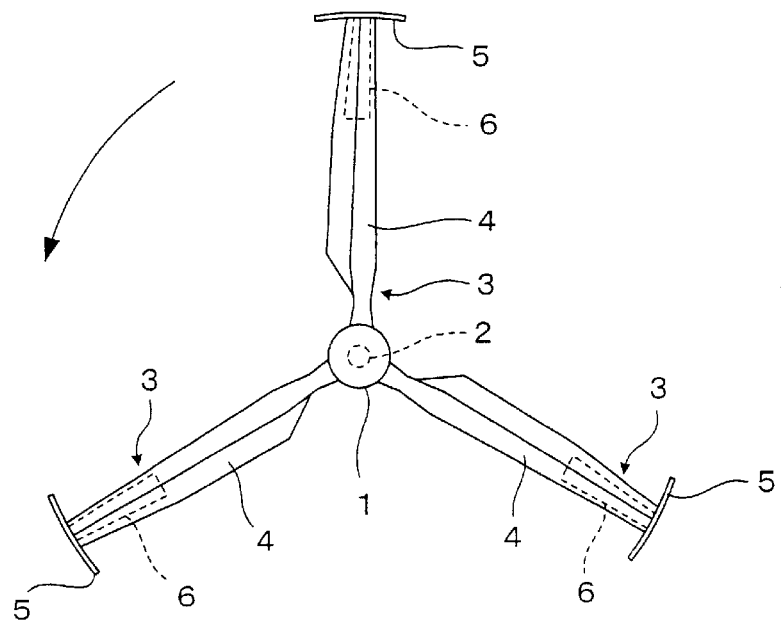
Figure 2:
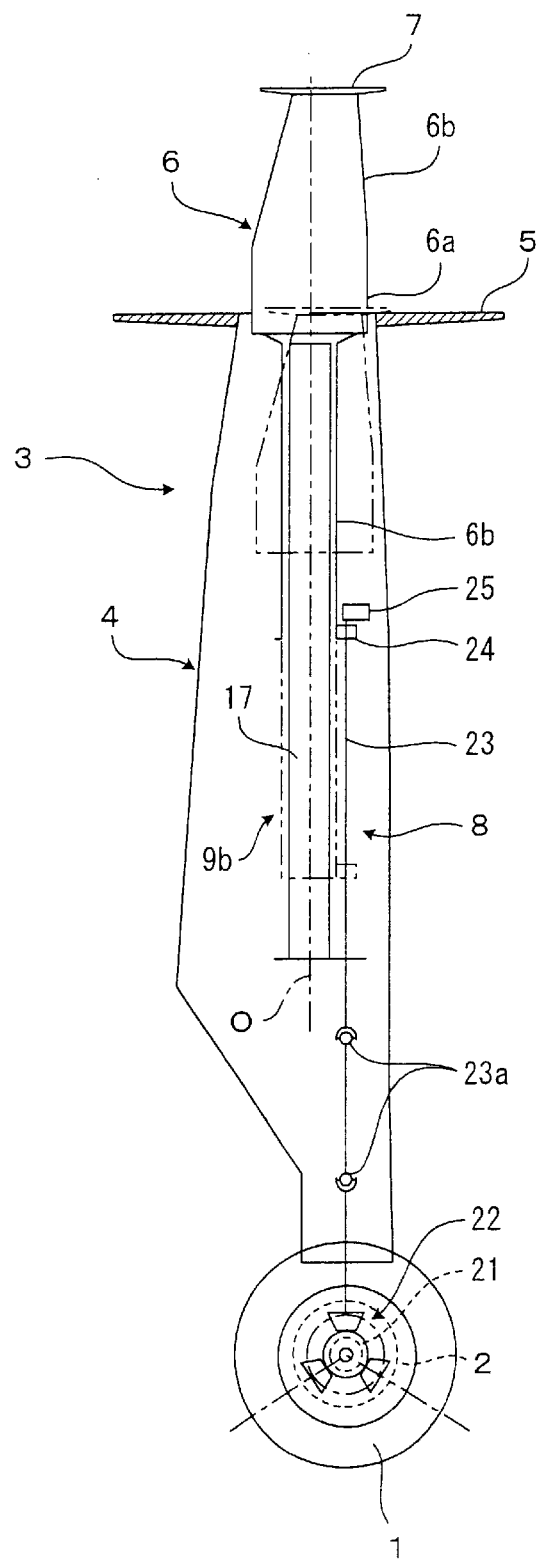
FIG. 2 is an overall structural diagram of a turbine blade of the same power-generating propeller-style wind turbine.
Figure 3:
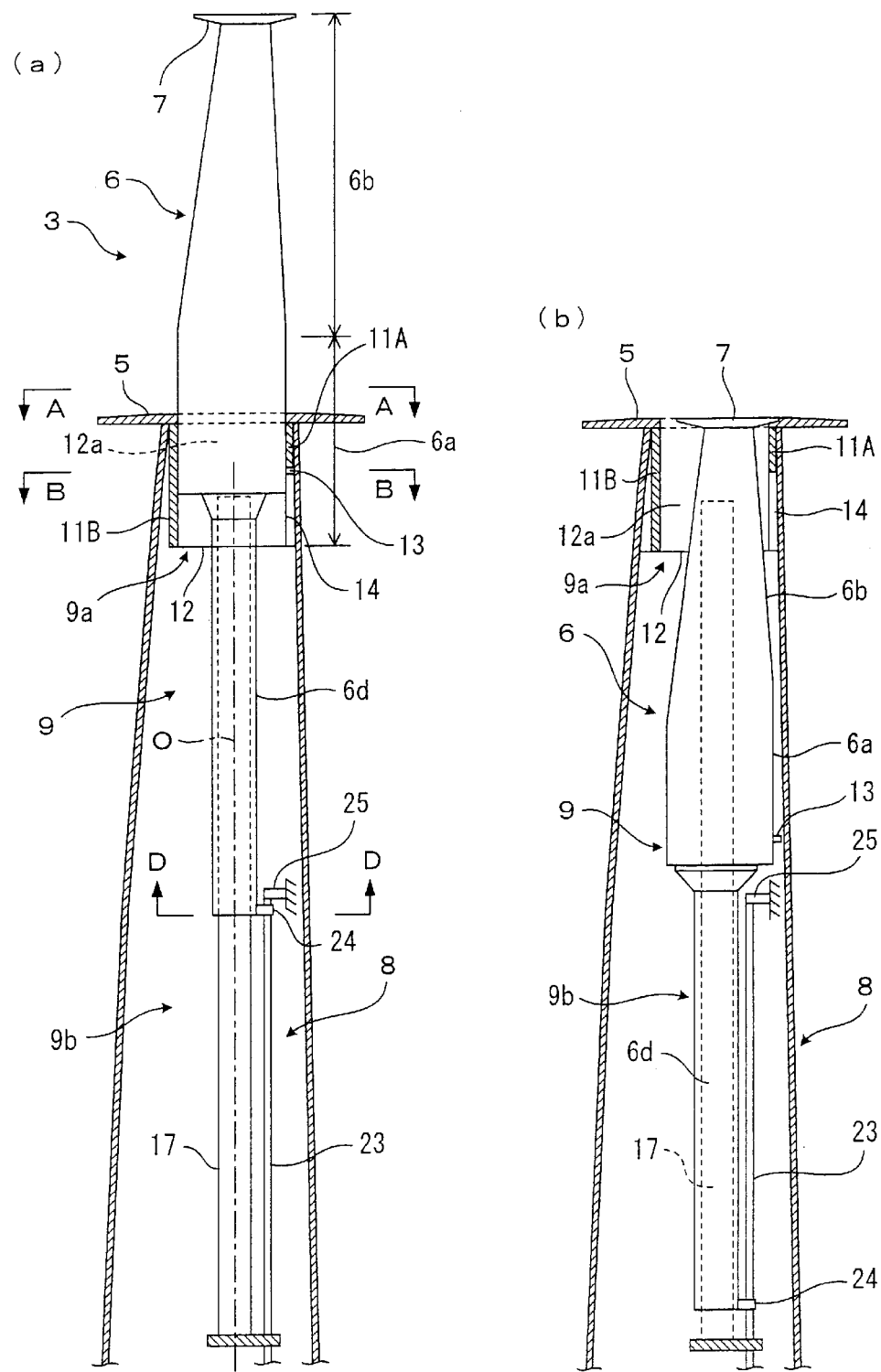
FIGS. 3 (*a*) and (*b*) illustrate an extension-and-retraction guide unit of the same turbine blade, with (a) being a front view of the tip auxiliary blade in the extended state, and (b) an overall front view of the tip auxiliary blade in the stowed state.

As shown in FIGS. 1 to 3, this propeller-style wind turbine has a hub 1 provided to a horizontal rotating shaft linked to a generator. This hub 1 is provided, for example, with three turbine blades 3 that extend radially at 120° intervals. The turbine blades 3 each comprise a blade body 4 attached to the hub 1, a main end plate 5 attached to the tip of the blade body 4, a tip auxiliary blade that is housed in the blade body so that it can extend from and retract into the main end plate 5 and has a tip end plate 7, and a tip auxiliary blade extension-and-retraction unit 8 for extending and retracting the tip auxiliary blade 6. The tip auxiliary blade extension-and-retraction unit 8 is provided with an extension-and-retraction guide member 9 that guides the tip auxiliary blade 6 to extend and retract and imparts a pitch thereof.

A continuously varying small pitch Ø (not shown) centering approximately around the blade axis O is imparted to the tip auxiliary blade 6. The tip auxiliary blade 6 comprises a parallel section 6a where the leading and trailing edges are parallel at the proximal end, a tapered section 6b where the leading and trailing edges taper together at the distal end of the parallel section 6a, and the tip end plate 7 attached to the distal end surface of the tapered section 6b. A slide support member 6d extending along the blade axis O inside the blade body 4 is linked to the parallel section 6a.

As shown in FIGS. 2 and 3, the tip auxiliary blade extension-and-retraction unit 8 comprises an extension-and-retraction drive motor 21 provided to the hub 1, an extension-and-retraction threaded shaft 23 that is rotationally driven by the extension-and-retraction drive motor 21 via a bevel gear mechanism 22, and a female threaded member 24 which is provided to the proximal end of the slide support member 6d and into which the extension-and-retraction threaded shaft 23 is fitted.

When the tip auxiliary blade 6 is extended, the turbine blade 3 has a large pitch Ø (say, about 20°) at its proximal end, and the pitch Ø decreases toward the tip, with the blade being twisted so that the pitch Ø will be close to 0° at the tip, and the cross sectional shape also varies continuously. Since there is little change in the pitch Ø on the tip side of the blade body 4 where the tip auxiliary blade 6 is housed, sufficient space is ensured for allowing the tapered section 6b, which has a small cross sectional area compared to the rest of the tip auxiliary blade 6, to be extendably stowed, but the parallel section 6a on the proximal end side has a larger cross sectional area, so there is not enough room for it to be twisted and still be able to extend and retract. Accordingly, if the parallel section 6a is extended and retracted linearly along its cross sectional shape, there will be a problem in that the pitch Ø is no longer continuous where the parallel section 6a links to the blade body 4. This is dealt with in this embodiment by moving the tapered section 6b linearly from the tip portion of the tip auxiliary blade 6 to a midway point, and thereafter when the parallel section 6a is extended, moving it while imparting a small amount of rotational displacement to the parallel section 6a with the extension-and-retraction guide member 9 of the tip auxiliary blade extension-and-retraction unit 8. As a result, when the tip auxiliary blade 6 has been extended all the way, the pitch Ø is continuous all along the blades 4 and 6.

Figure 4:
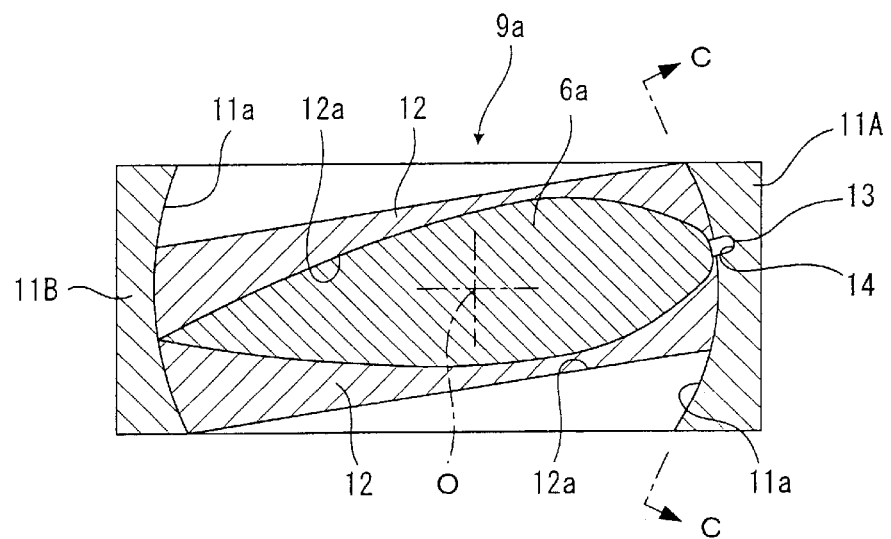
FIG. 4 is a cross section along a B—B line in FIG. 3 (*a*).
Figure 5:
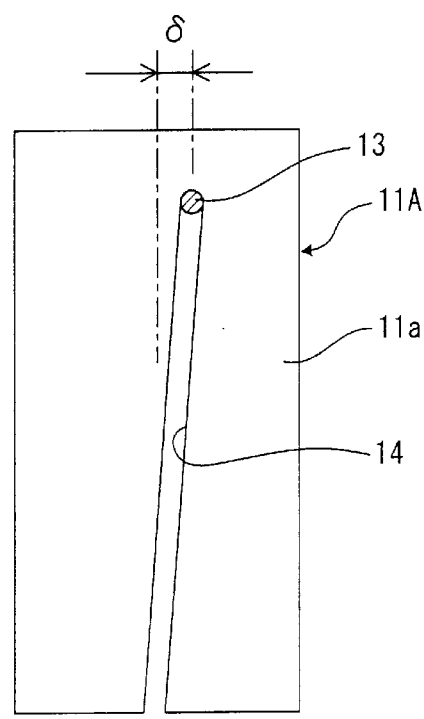
FIG. 5 is a cross section along a C—C line in FIG. 4.

Specifically, the extension-and-retraction guide member 9 comprises a pitch changing guide member 9a that adds pitch and guides the parallel section 6a at the tip portion inside the blade body 4, and a slide guide member 9b that guides the above-mentioned slide support member 6d. As shown in FIGS. 4 and 5, the pitch changing guide member 9a is such that a pair of twist guides 11A and 11B, on each of which is formed an arc guide surface 11a centering around the blade axis O, with these surfaces facing each other, are attached within the blade body 4 in order to add rotational displacement to the tip auxiliary blade 6 so that the parallel section 6a moves around the blade axis O. Twist members 12 are disposed between the twist guides 11A and 11B so as to be rotatable around the blade axis O along the arc guide surfaces 11a. Slide recesses 12a for guiding the parallel section 6a are formed in the twist members 12. A ball guide 13 juts out from the leading edge part of the parallel section 6a, and a twist guide groove 14 for guiding the ball guide 13 is formed in the twist guide 11A. As shown in FIG. 5, the twist guide groove 14 is angled by a specific amount δ in the direction in which the pitch Ø is formed so as to achieve the specified rotational displacement at the top.

Therefore, as the tip auxiliary blade 6 extends and moves closer to its limit of extension, the parallel section 6a is guided by the slide recesses 12a of the twist members 12, the ball guide 13 moves along the twist guide groove 14, and as the limit of extension is approached, the inclination of the twist guide groove 14 causes the tip auxiliary blade 6 to be extended along with the twist members 12 via the parallel section 6a, while twisting by the specified rotational displacement δ around the blade axis O.

Figure 6:
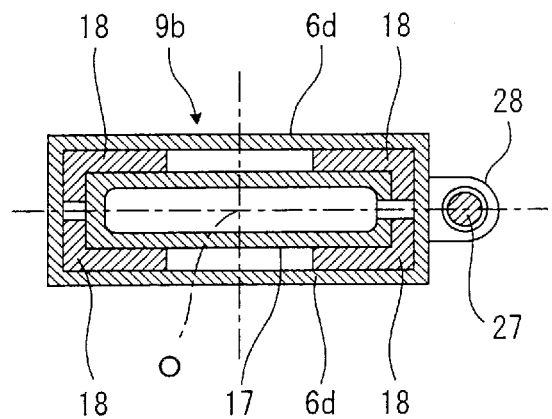
FIG. 6 is a cross section along a D—D line in FIG. 3 (*a*).
Figure 7:
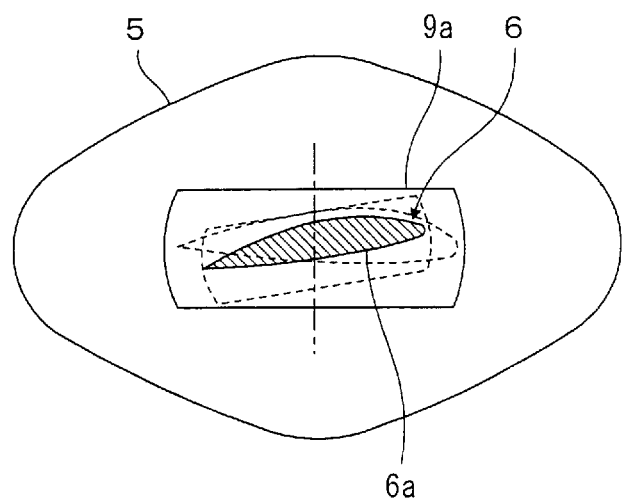
FIG. 7 is a cross section along an A—A line in FIG. 3 (*a*).

As shown in FIGS. 3 and 6, the slide guide member 9b is designed such that the slide support member 6d is formed with a hollow rectangular cross section, while a guide frame 17, which has a rectangular cross section and is supported by the blade body 4, is provided along the blade axis O, and the slide support member 6d is slidably fitted over the guide frame 17 via corner members 18. The extension-and-retraction threaded shaft 23 is supported by a bearing 25 and has a plurality of movable joints 23a interposed on its proximal end side, allowing it conform to the twisting of the extension-and-retraction threaded shaft 23.

Figure 8:
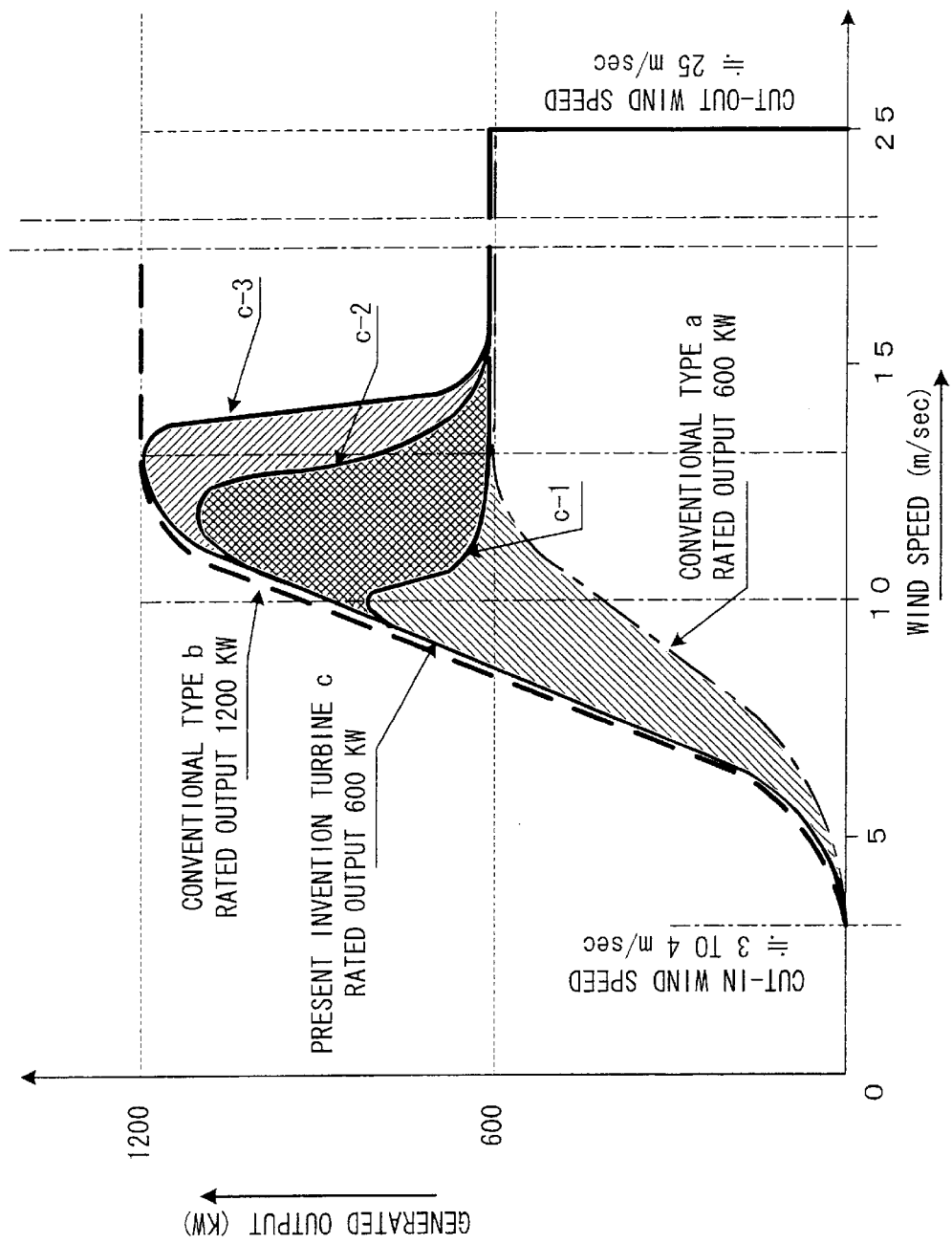
FIG. 8 is a graph showing relationship between wind speed and power generation in the same power-generating propeller-style wind turbine.

FIG. 8 is a graph of the relationship between wind speed and power generation in a power-generating propeller-style wind turbine. For example, the turbine blades 3 begin rotating from a cut-in line at a wind speed of approximately 3 to 4 m/sec, and reach the specified rotational speed within a short time. The amount of power generated increases as a function of the rotating torque obtained at that wind speed. Specifically, with a conventional wind turbine with a rated output (power generation) of 600 kW, for example, as indicated by curve a, power generation increases as a function of wind speed, the rated output is obtained at the rated wind speed (about 13 m/sec), and any further increase in wind speed results in no further increase in power generation. With a conventional wind turbine with a rated power generation (output) of 1200 kW, as indicated by curve b, there is sharp rise in power generation as wind speed increases, and once again the rated output is obtained when the rated wind speed (about 13 m/sec) is reached. With the present invention, when, for example, the rated power generation is set to be 600 kW when the tip auxiliary blades 6 are stowed, and the rated power generation is set to be 1200 kW when the tip auxiliary blades 6 are extended, as indicated by curve c, since the tip auxiliary blades 6 are extended when wind speed is low, a high rotating torque is obtained and power generation increases just as with a wind turbine whose rated power generation is 1200 kW. If the rated wind speed is set to 10 m/sec on the basis of the strength of the turbine blades 3, for example, then when the tip auxiliary blades 6 are retracted and stowed inside the blade bodies 4, as indicated by curve c-1, there is a drop in power generation to the rated 600 kW, after which the rated power generation of 600 kW is maintained. If the rated wind speed is 12 m/sec, as indicated by curve c-2, the power generation again drops to 600 kW. Similarly, when the rated wind speed is 13 m/sec, as indicated by curve c-3, the output drops to 600 kW. Thus, in every case, when the wind speed is between 6 and 13 m/sec, the amount of power generated is higher than that of a wind turbine with a rated output of 600 kW by the amount indicated by hatching.

If there is a powerful wind blowing faster than about 25 m/sec, this is used as the cut-out wind speed, at which the rotation of the turbine blades 3 is forcibly halted in order to prevent damage.

With the above structure, the construction scale and expense can be kept small, and a large lift and rotating torque can be obtained and high power generating performance achieved at low wind speed by using the tip auxiliary blades 6. At the rated wind speed, the tip auxiliary blades 6 can be stowed so as to maintain the rated output. This allows the wind speed at which power generation can be increased to be set over a wider range that includes lower wind speeds. Furthermore, because the pitch addition means 11 provided to the extension-and-retraction guide unit 9, when the tip auxiliary blades 6 are extended from inside the blade bodies 4, a specific rotational displacement is imparted, allowing a continuous pitch to be formed from the blade bodies 4 to the tip auxiliary blades 6, so operation is more efficient.

Figure 9:
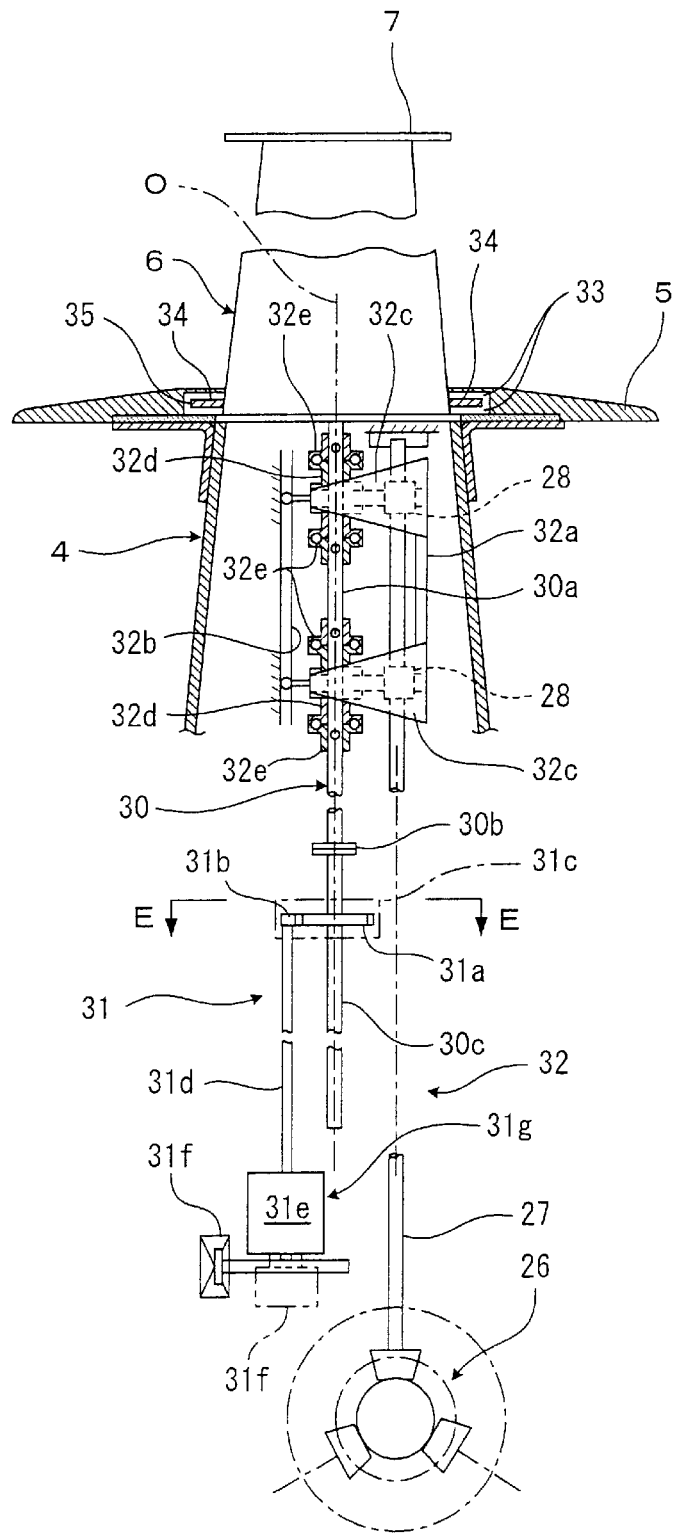
FIG. 9 is a structural diagram illustrating a variation example of pitch addition means and an extension-and-retraction guide unit in the first embodiment.
Figure 10:
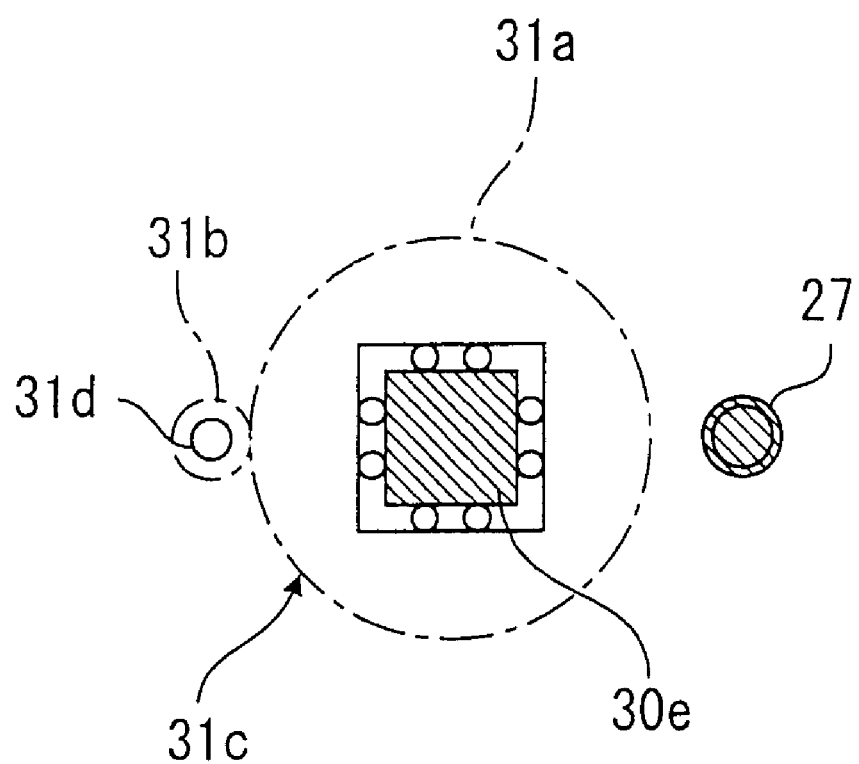
FIG. 10 is a cross section along an E—E line in FIG. 9.

FIGS. 9 and 10 illustrate a variation example of the auxiliary blade extension-and-retraction unit and the pitch addition means.

Specifically, a revolving member 34 is provided to the main end plate 5 via a pitch changing bearing 33, and the proximal end of the tip auxiliary blade 6 is removably fitted into a support hole 35 in the revolving member 34. A pitch changing shaft 30 extending along the blade axis O is attached in the proximal end direction to the tip auxiliary blade 6, and an auxiliary blade pitch changing unit (pitch addition means) 31 for changing the pitch of the tip auxiliary blade 6, and an auxiliary blade extension-and-retraction unit 32 for driving the tip auxiliary blade 6 to extend and retract are provided via the pitch changing shaft 30.

The pitch changing shaft 30 comprises a circular shaft component 30a at the distal end, and a rectangular shaft component 30c linked via a flange 30b to the proximal end of the circular shaft component 30a. The auxiliary blade pitch changing unit 31 comprises a transmission gear component 31c consisting of a driven gear 31a fitted slidably in the axial direction to the rectangular shaft component 30c, and a drive gear 31b that meshes with the driven gear; a low-speed gearbox 31e that drives the drive gear 31b via an intermediate shaft 31d; and a pitch changing input component 31g that inputs to the low-speed gearbox 31e by means of a step motor 31f, either directly or via a rack and input pinion.

The auxiliary blade extension-and-retraction unit 32 has substantially the same structure as in the previous example, but transmission arms 32c having an antirotation mechanism 32b consisting of a guide member and a guide groove are provided to a slide member 32a having a pair of upper and lower female threaded members 28, and the circular shaft component 30a of the pitch changing shaft 30 is linked to these transmission arms 32c so as to be capable only of rotation. Specifically, cylinder members 32d that fit over the circular shaft component 30a are attached to the transmission arms 32c, and rotatable transmission bearings 32e are fixed to the top and bottom parts of each of the cylinder members 32d on the circular shaft component 30a. As a result, an extension-and-retraction drive force is transmitted along the blade axis O of the transmission arms 32c to the circular shaft component 30a, which drives the extension-and-retraction of the tip auxiliary blade 6.

According to this embodiment, the same effects as in the previous embodiment can be obtained, and furthermore it is possible to generate power efficiently while keeping the turbine blades 4 at a constant rotational speed by changing the pitch Ø of the tip auxiliary blades 6 with the auxiliary blade pitch changing unit 31 via the pitch changing shaft 30 as dictated by the wind speed.

A second embodiment of a power-generating propeller-style wind turbine will now be described through reference to FIGS. 11 to 15.

With this propeller-style wind turbine, turbine blades 41 extend from a hub 40 every 120°, a plurality of leading edge auxiliary vanes 43 are provided to the leading edges of blade bodies 42 so as to be extendable and retractable frontward in the rotation direction, and rear auxiliary vanes 51 are provided to the rear part of the blade bodies 42 so as to be extendable and retractable rearward in the rotation direction.

Figure 11:
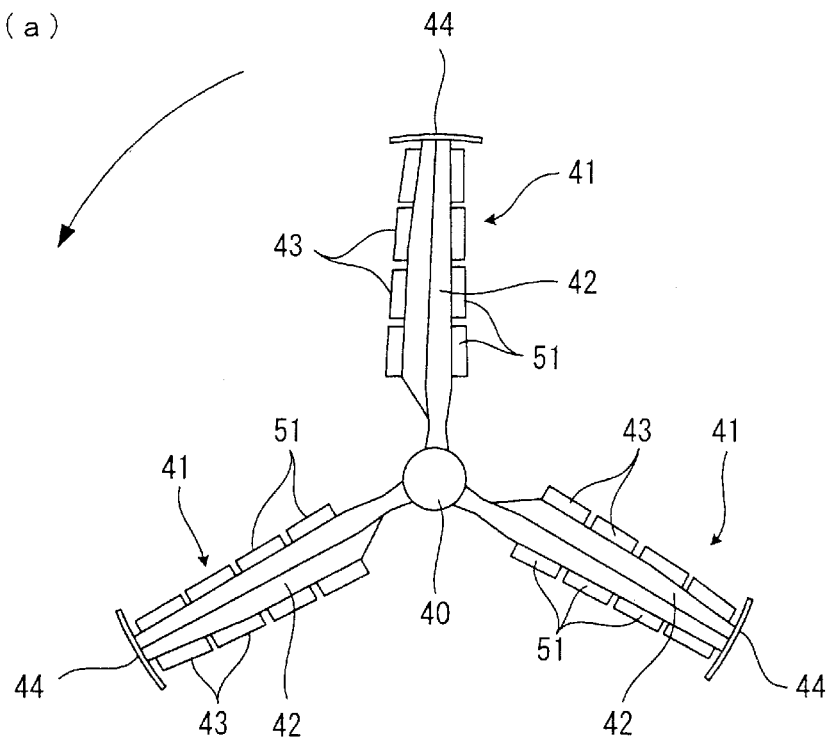
FIGS. 11 (*a*) and (*b*) illustrate a second embodiment of the power-generating propeller-style wind turbine pertaining to the present invention, with (a) being an overall front view of leading edge auxiliary vanes and rear auxiliary vanes in the extended state, and (b) an overall front view of the leading edge auxiliary vanes and rear auxiliary vanes in the stowed state.
Figure 11:
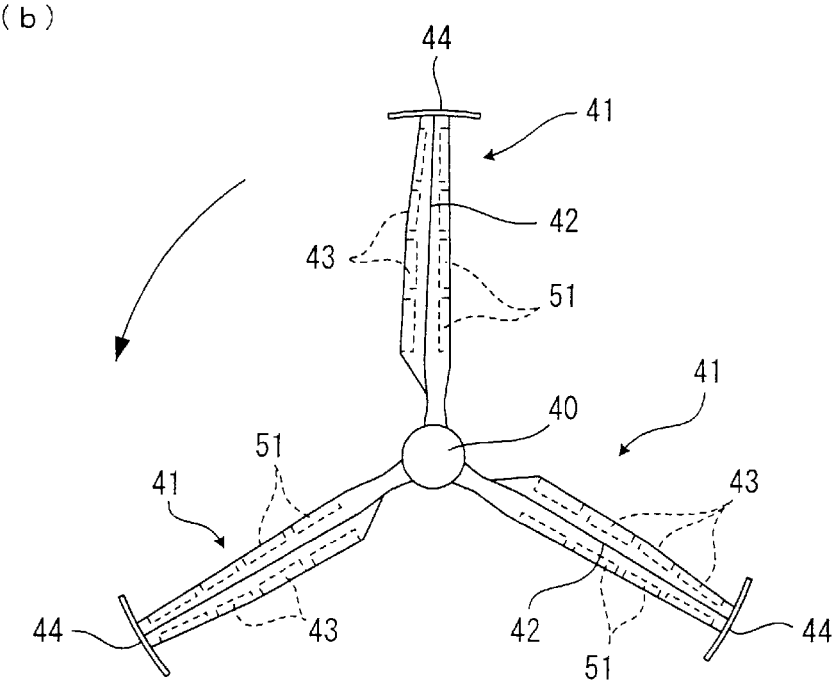
Figure 12:
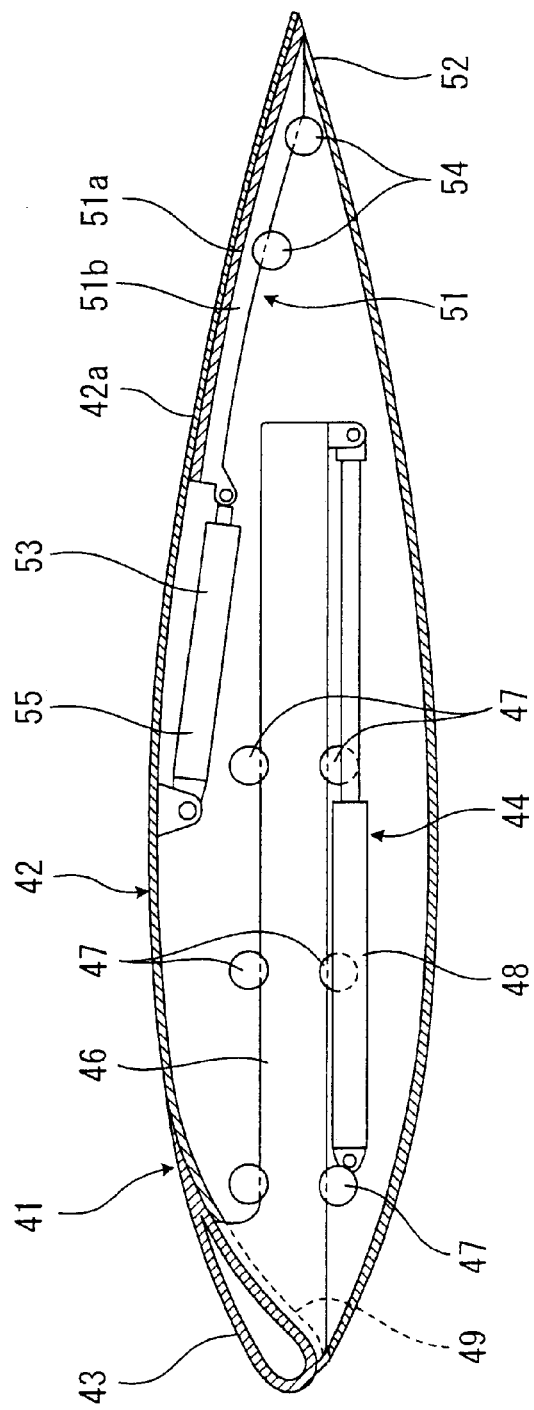
FIG. 12 is a lateral cross section of the leading edge auxiliary vane and the rear auxiliary vane of the same turbine blade when stowed.
Figure 13:
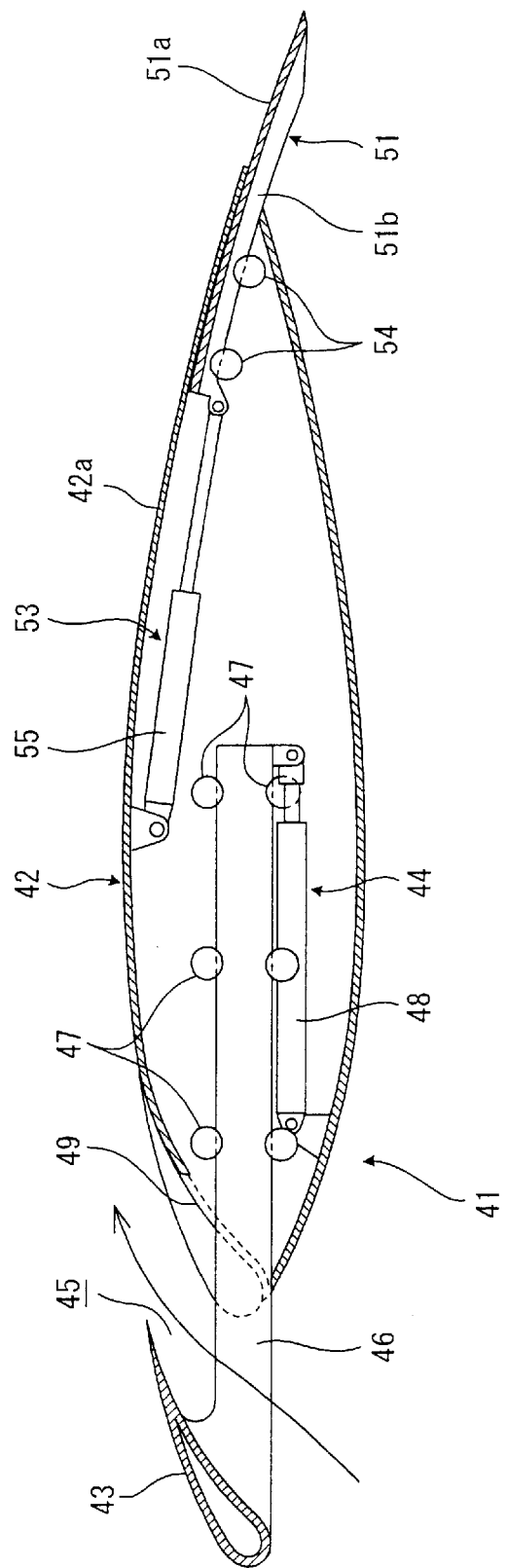
FIG. 13 is a lateral cross section of the leading edge auxiliary vane and the rear auxiliary vane of the same turbine blade when extended.
Figure 14:
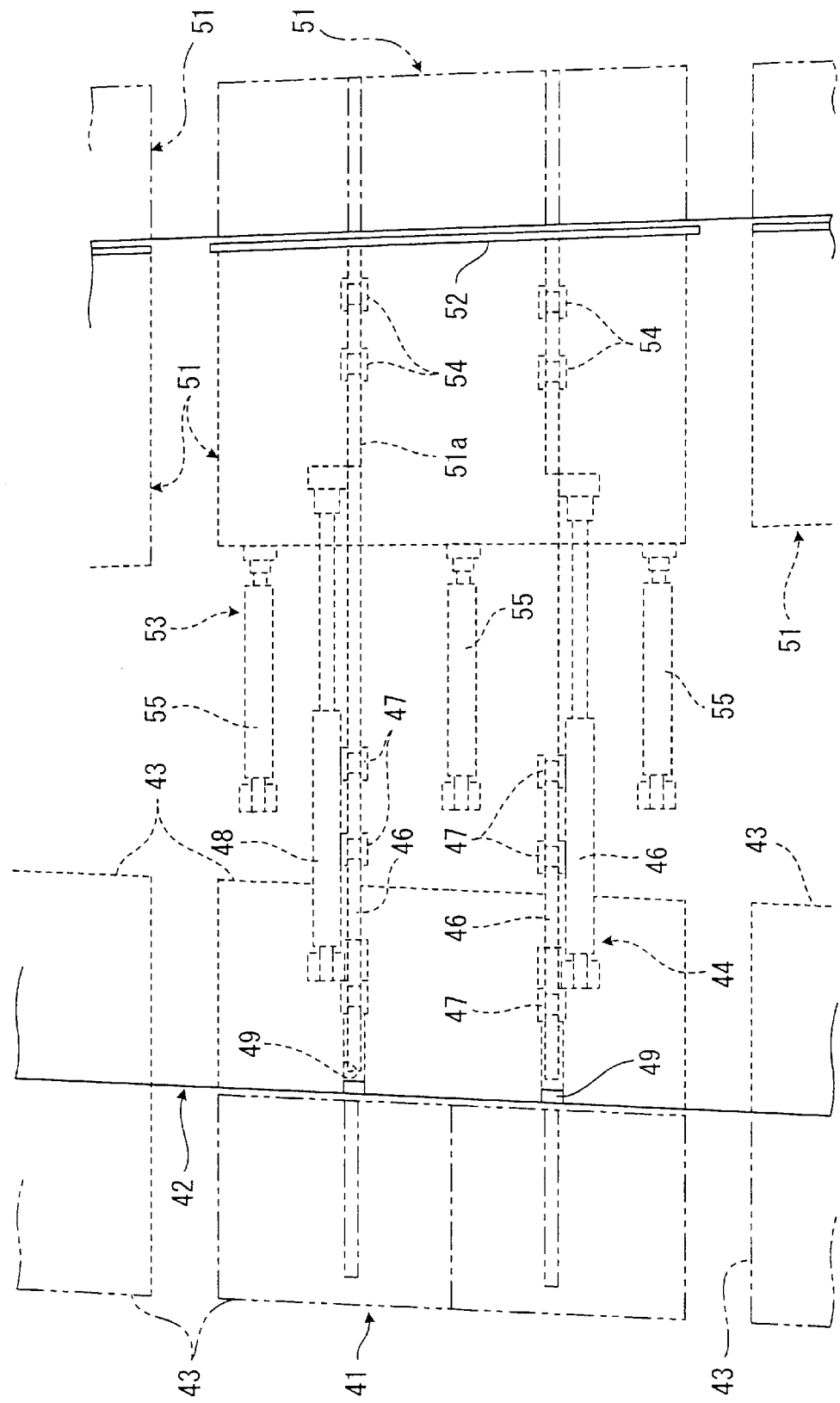
FIG. 14 is a partial enlarged front view of the same turbine blade.

As shown in FIGS. 11 to 13, each blade body 42 is provided with an end blade 44 at its distal end, and is formed in an airfoil-shaped cross section. Leading edge auxiliary vanes 43 that are able to move away from the blade body 42 are provided all the way from the leading edge of the blade body 42 to the rear face, divided into a plurality of segments in the lengthwise direction. Leading edge auxiliary vane extension-and-retraction units 50 that drive the of the leading edge auxiliary vanes 43 to extend and retract frontward are provided inside the blade body 42. These leading edge auxiliary vanes 43 are formed with a cambered airfoil-shaped cross section, and move away from the blade body 42 when extended frontward in the rotation direction. This forms a path 45 for guiding the airflow between the blade body 42 and the leading edge auxiliary vanes 43 to the rear face of the blade body 42. This path 45 streamlines the airflow moving to the rear face of the blade body 42, so lift and rotating torque are generated at the leading edge auxiliary vanes 43 even when the incoming airflow is low in speed.

The leading edge auxiliary vane extension-and-retraction units 50 are such that a plurality of support guide plates 46 are provided extending toward the blade body 42 in the extension and retraction direction from the rear surface of the leading edge auxiliary vanes 43, and are inserted into extension and retraction holes 49 in the blade body 42. The support guide plates 46 are extendably and retractably guided and supported by a plurality of grooved guide rollers 47 inside the blade body 42. The output rods of a plurality of extension-and-retraction drive units (such as hydraulic cylinder of electric jacks) 48 disposed inside the blade body 42 are linked to the support guide plates 46 so that the leading edge auxiliary vanes 43 can be driven to extend and retract.

The basic principle behind the performance of the leading edge auxiliary vanes 43 will now be described.

Figure 15:
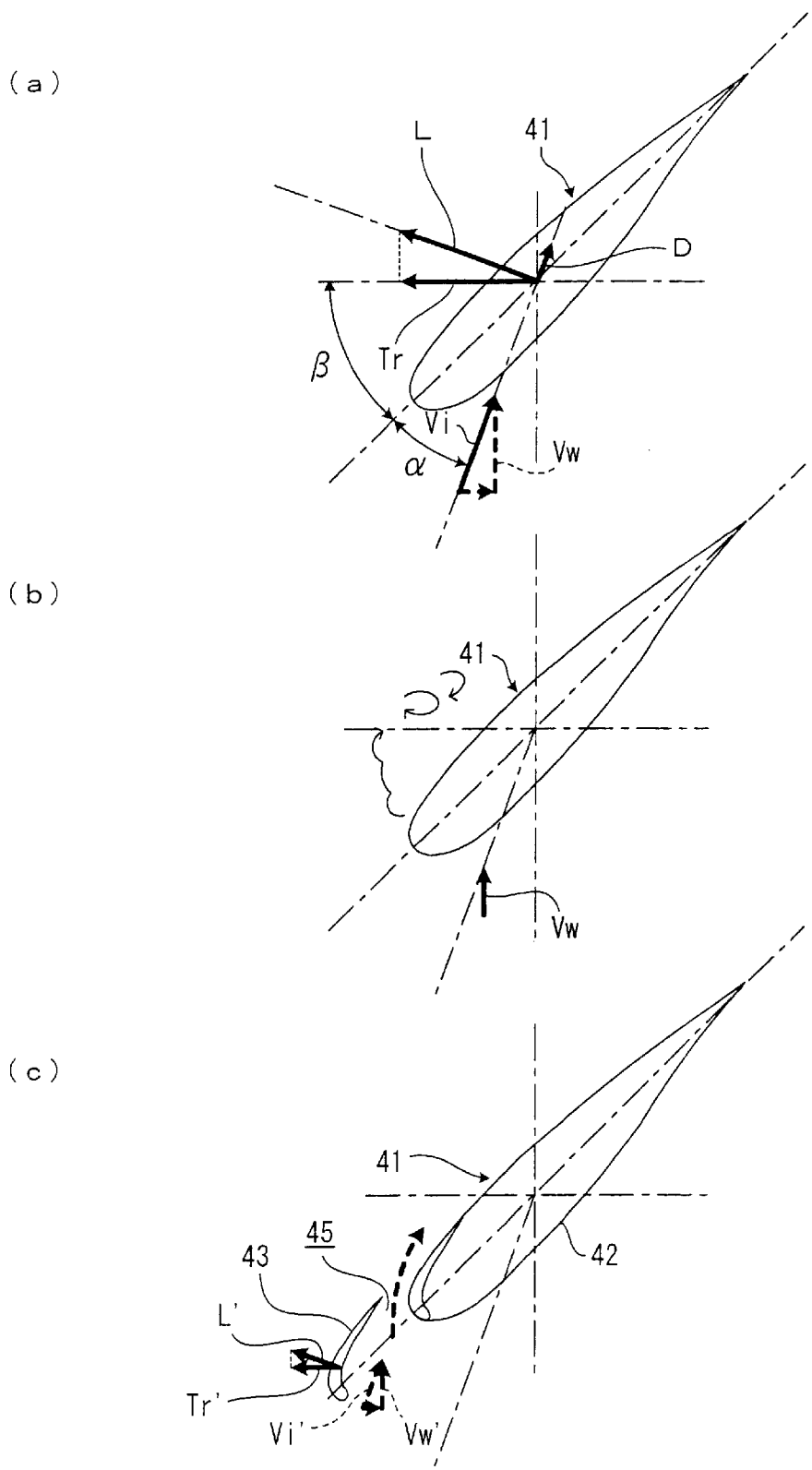
FIGS. 15 (*a*) to (*c*) are lateral cross sections illustrating operations of the same turbine blade, with (a) being an operational diagram during normal power generation, (b) an operational diagram when the wind is calm, and (c) an operational diagram when the leading edge auxiliary vanes are extended.

As shown in FIG. 15 (a), when a turbine blade 41 rotates at a specific speed and encounters an airflow with a velocity of Vw, the airflow comes in at a velocity of Vi in a relative angular direction (blade attachment angle β+angle of incidence α). As a result, a drag D in the incoming direction and a lift L in the direction perpendicular to the incoming direction are generated, the component force of the lift L in the rotation direction acts on the turbine blade 41 as a force Tr that generates rotating torque, and a generator is actuated by this force Tr that generates rotating torque, thereby generating electricity. As shown in FIG. 15 (b), when the velocity Vw of the airflow is low, no lift L is generated and the airflow does not contribute to power generation.

In this case, as shown in FIG. 15 (c), when the leading edge auxiliary vanes 43 are extended forward from the blade body 42, the airflow Vw is guided by the leading edge auxiliary vanes 43 so that it flows from the path 45 toward the rear face of the blade body 42, any eddy currents are smoothed out to prevent separation flow and promote the generation of lift L at the blade body 42, a force Tr' that generates rotating torque and lift L' at the leading edge auxiliary vanes 43 is generated by a relative inflow velocity Vi' toward the leading edge auxiliary vanes 43, this force Tr' acts on the blade body 42 so that rotating torque that contributes to power generation will be generated at the turbine blade 41 even with a low-speed airflow Vw, and the rotating speed is accelerated, allowing power to be generated at the specified rotating speed.

A plurality of rear auxiliary vanes 51 are arranged in the lengthwise direction along the blade body 42. These rear auxiliary vanes 51 are disposed so as to be capable of rearward extension from and retraction into extension-and-retraction holes 52 in the trailing edge of the blade body 42. Also, rear auxiliary vane extension-and-retraction units 53 that increase the vane arc length of the turbine blade 41 by extending the rear auxiliary vanes 51 rearward are provided inside the blade body 42.

These rear auxiliary vanes 51 each comprise a vane plate 51a disposed slidably along the inner surface of a back plate 42a of the blade body 42, and a reinforcing rib 51b provided to the front side of the vane plate 51a in the extension-and-retraction direction. The rear auxiliary vane extension-and-retraction units 53 comprise a plurality of grooved guide rollers 54 that extendably and retractably guide the vane plates 51a via the reinforcing ribs 51b, and a plurality of extension-and-retraction drive units (such as hydraulic cylinders or electric jacks) 55 in which the output rods are linked to the rear auxiliary vanes 51 within the blade body 42. The rear auxiliary vanes 51 can be extended rearward from the extension-and-retraction holes 52 by deploying the extension-and-retraction drive units 55.

With the above structure, when the turbine blade 41 rotates at a specific speed and the velocity of the airflow coming in to the wind turbine is low, as shown in FIGS. 11 and 13, the leading edge auxiliary vanes 43 are extended rearwardly by the leading edge auxiliary vane extension-and-retraction units 50, and the rear auxiliary vanes 51 are extended by the rear auxiliary vane extension-and-retraction units 53.

Lift L is generated by the leading edge auxiliary vanes 43, the component force thereof generates a force Tr' that generates rotating torque, and this force Tr' acts on the blade body 42, which yields a higher rotating torque. Either the vane arc length of the turbine blade 41 is increased, or the vane camber is increased, or the vane arc length and vane camber are both increased, by the rear auxiliary vanes 51, thereby increasing the force Tr that generates the rotating torque of the blade bodies 42. The result of these effects is that even with a low-speed airflow, the turbine blades 41 can be rotated at the specified speed and a high torque obtained, affording an increase in the amount of power generated.

It is also possible to extend just the leading edge auxiliary vanes 43 or the rear auxiliary vanes 51 according to the incoming velocity of the airflow. Naturally, if the airflow velocity is high, the leading edge auxiliary vanes 43 should be retracted into the blade body 42, and the rear auxiliary vanes 51 should be retracted and stowed in the blade body 42 as well. This lowers the drag of the turbine blade 41 prevents damage that could be caused by strong winds.

Figure 16:
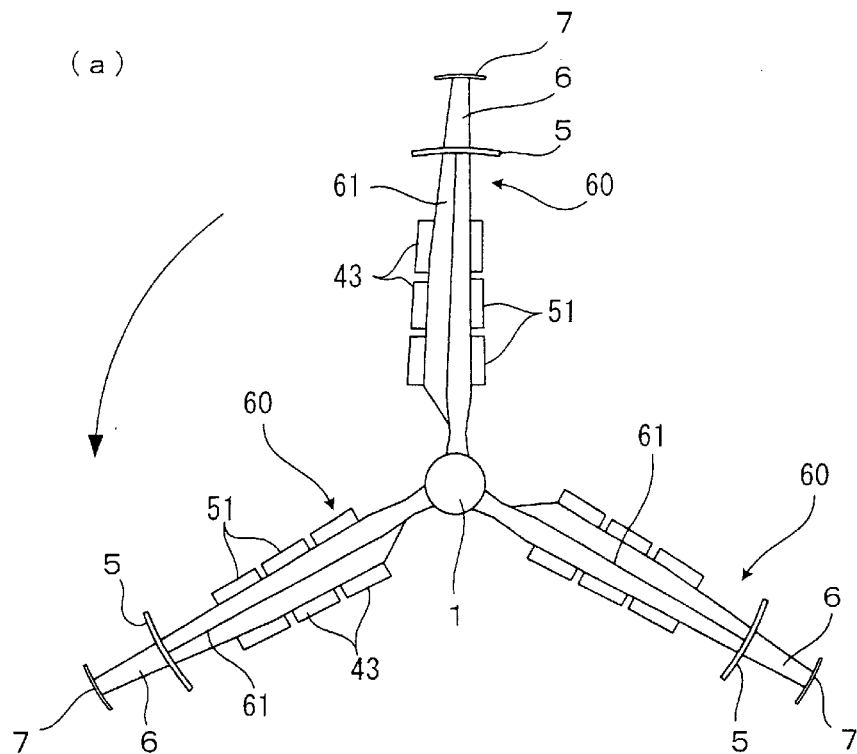
FIGS. 16 (*a*) and (*b*) illustrate a third embodiment of the power-generating propeller-style wind turbine pertaining to the present invention, with (a) being an overall front view of the tip auxiliary blades, leading edge auxiliary vanes and rear auxiliary vanes in the extended state, and (b) an overall front view of the tip auxiliary blades, leading edge auxiliary vanes and rear auxiliary vanes in the stowed state.
Figure 16:
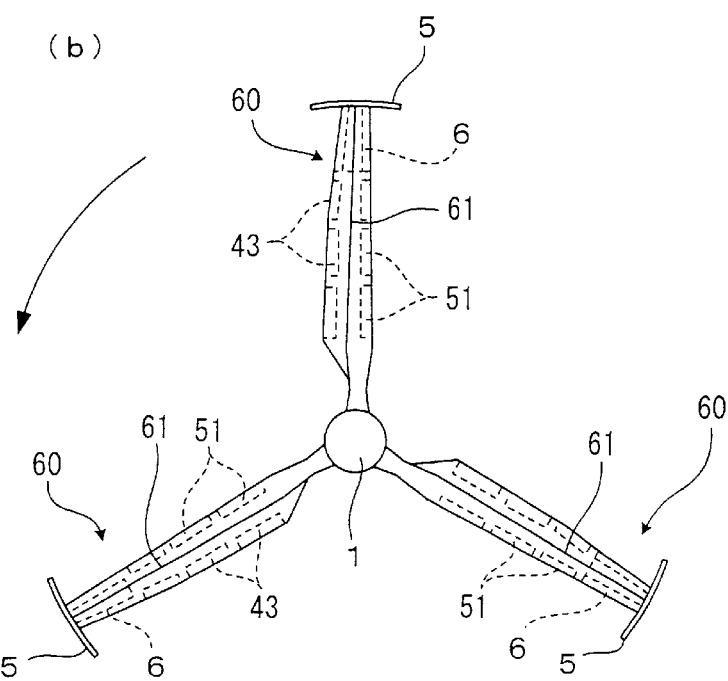

FIG. 16 illustrates a third embodiment that combines the first embodiment with the second embodiment. The tip auxiliary blades 6, the leading edge auxiliary vanes 43, and the rear auxiliary vanes 51 are all extendably and retractably housed within a blade body 61 of a turbine blade 60.

With this structure, the effects of the first embodiment are combined with the effects of the second embodiment, so that even if the airflow is slower yet, effective rotating torque can be generated by the tip auxiliary blades 6, the leading edge auxiliary vanes 43, and the rear auxiliary vanes 51, allowing power to be generated.

Industrial Applicability

As discussed above, the power-generating propeller-style wind turbine pertaining to the present invention is suited to wind-powered electrical generation in such areas where the wind speed is low.

The invention has been described with particular reference to cues for playing pool. The features of the invention could also be used for similar games such as billiards, snooker, bumper pool and the like. What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

What is claimed is:

1. A power-generating propeller-style wind turbine provided with a plurality of turbine blades distributed equiangularly within a plane perpendicular to a horizontal rotating shaft and around a hub provided on the rotating shaft, the turbine blades each having a blade tip, said turbine comprising:

a blade body of each of said plurality of turbine blades, wherein each body includes a tip auxiliary blade housed in said blade body and able to extend towards and extract away from a blade tip;

an auxiliary blade extension-and-retraction unit for protruding the tip auxiliary blade toward the respective blade tips to increase an overall length of the blade; and a pitch changing guide member for changing a pitch of said tip auxiliary blade operatively connected to an extension-and-retraction guide unit for guiding said tip auxiliary blade to extend and retract.

2. A power-generating propeller-style wind turbine provided with a plurality of turbine blades distributed equiangularly within a plane perpendicular to a horizontal rotating shaft and around a hub provided on the rotating shaft, the turbine blades each having a blade tip, said turbine comprising:

a blade body of each of said plurality of turbine blades, wherein said body includes a tip auxiliary blade housed in said blade body and able to extend towards and retract away from a blade tip, and an auxiliary blade extension-and-retraction unit for protruding the tip auxiliary blade toward the respective blade tips to increase an overall length of the blade;

a leading edge auxiliary vane having an airfoil-shaped cross section capable of forming, between the vane and the blade body, a path for guiding an airflow to a rear face of the blade body, each path being disposed at a leading edge portion of the blade body of each of said turbine blades to be able to extend and retract frontwardly in a rotational direction; and a leading edge auxiliary vane extension-and-retraction unit for protruding said leading edge auxiliary vane frontwardly in said rotational direction and guiding the airflow from the path thus formed to the rear face of the blade body to generate lift on the leading edge auxiliary vane and to increase a rotating torque of the turbine blade.

3. The power-generating propeller-style wind turbine according to claim 2, and further comprising a pitch changing guide member for changing a pitch of the tip auxiliary blade, and an extension-and-retraction guide unit, said pitch changing guide member being operatively connected to said extension-and-retraction guide unit for guiding the tip auxiliary blade to extend and retract.

4. A power-generating propeller-style wind turbine provided with a plurality of turbine blades distributed equiangularly within a plane perpendicular to a horizontal rotating shaft and around a hub provided on the rotating shaft, the turbine blades each having a blade tip, said turbine comprising:

a blade body of each of said plurality of turbine blades, wherein said body includes a tip auxiliary blade housed in said blade body and able to extend towards and retract away from a blade tip, and an auxiliary blade extension-and-retraction unit for protruding the tip auxiliary blade toward the respective blade tips to increase an overall length of the blade;

a leading edge auxiliary vane having an airfoil-shaped cross section capable of forming, between the vane and the blade body, a path for guiding an airflow to a rear face of the blade body, each path being disposed at a leading edge portion of the blade body of each of said turbine blades to be able to extend frontwardly in a rotational direction; and a leading edge auxiliary vane extension-and-retraction unit for protruding said leading edge auxiliary vane frontwardly in said rotational direction and guiding the airflow from the path thus formed to the rear face of the blade body to generate lift on the leading edge auxiliary vane and to increase a rotating torque of the turbine blade;

each of said blade bodies of each turbine blade including a rear auxiliary vane provided at a trailing edge portion able to extend and retract rearwardly in the rotational direction, and a rear auxiliary vane extension-and-retraction unit for protruding the rear auxiliary vane to extend rearwardly to increase a vane arc length.

5. The power-generating propeller-style wind turbine according to claim 4, and further comprising a pitch changing guide member for changing a pitch of the tip auxiliary blade, and an extension-and-retraction guide unit, said pitch member being operatively connected to said extension-and-retraction guide unit for guiding the tip auxiliary blade to extend and retract.

6. A power-generating propeller-style wind turbine provided with a plurality of turbine blades distributed equiangularly within a plane perpendicular to a horizontal rotating shaft and around a hub provided on the rotating shaft, said turbine blades each having a blade body, said turbine comprising:

a leading edge auxiliary vane having an airfoil-shaped cross section capable of forming, between the vane and the blade body, a path for guiding an airflow to a rear face of the blade body, each path being disposed at a leading edge portion of the blade body of each of the turbine blades to be able to extend and retract frontwardly in a rotational direction; and a leading edge auxiliary vane extension-and-retraction unit for protruding said leading edge auxiliary vane frontwardly in said rotational direction and guiding the airflow from the path thus formed to the rear face of the blade body to generate lift on the leading edge auxiliary vane and increase a rotating torque of the turbine blade.

7. The power-generating propeller-style wind turbine according to claim 6, wherein the blade body of each turbine blade includes a rear auxiliary vane provided at a trailing edge portion able to extend and retract rearwardly in the rotational direction, and a rear auxiliary vane extension-and-retraction unit for protruding the rear auxiliary vane rearwardly to increase a vane arc length.

8. A power-generating propeller-style wind turbine provided with a plurality of turbine blades distributed equiangularly within a plane perpendicular to a horizontal rotating shaft and around a hub provided on the rotating shaft, comprising a blade body of each turbine blade wherein each of said blade body of each turbine blade includes a rear auxiliary vane provided at a trailing edge portion able to extend and retract rearwardly in the rotational direction, and a rear auxiliary vane extension-and-retraction unit for protruding the rear auxiliary vane rearwardly to increase a vane arc length.

* * * * *